(12) United States Patent
Koenig et al.

(10) Patent No.: US 11,354,281 B2
(45) Date of Patent: Jun. 7, 2022

(54) DATA ANALYTIC SYSTEMS

(71) Applicant: PALANTIR TECHNOLOGIES INC., Palo Alto, CA (US)

(72) Inventors: Patrick Koenig, Mountain View, CA (US); Paul Nepywoda, Palo Alto, CA (US); Robert Fink, San Francisco, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 379 days.

(21) Appl. No.: 15/815,367

(22) Filed: Nov. 16, 2017

(65) Prior Publication Data

US 2019/0114335 A1   Apr. 18, 2019

(30) Foreign Application Priority Data

Oct. 17, 2017  (EP) .................................... 17196924

(51) Int. Cl.
| | | |
|---|---|---|
| *G06F 16/21* | (2019.01) | |
| *G06F 16/23* | (2019.01) | |
| *G06F 16/2455* | (2019.01) | |
| *G06F 16/25* | (2019.01) | |
| *G06F 16/2453* | (2019.01) | |

(52) U.S. Cl.
CPC ........ *G06F 16/211* (2019.01); *G06F 16/2365* (2019.01); *G06F 16/2455* (2019.01); *G06F 16/24532* (2019.01); *G06F 16/254* (2019.01)

(58) Field of Classification Search
CPC ......... G06F 17/30292; G06F 17/30371; G06F 17/30477; G06F 16/211; G06F 16/2455; G06F 16/2365; G06F 16/24532; G06F 16/254

See application file for complete search history.

(56) References Cited

U.S. PATENT DOCUMENTS

| | | | |
|---|---|---|---|
| 6,857,123 B1 | 2/2005 | Nuxoll et al. | |
| 9,229,952 B1* | 1/2016 | Meacham | ........... G06F 17/3023 |
| 2003/0182313 A1* | 9/2003 | Federwisch | ......... G06F 11/2066 |
| 2013/0246560 A1 | 9/2013 | Feng et al. | |
| 2016/0125000 A1 | 5/2016 | Meacham et al. | |
| 2016/0321307 A1* | 11/2016 | Dingman | .............. G06F 16/211 |

FOREIGN PATENT DOCUMENTS

| | | |
|---|---|---|
| EP | 2857995 | 4/2015 |
| EP | 3258393 | 12/2017 |

OTHER PUBLICATIONS

Official Communication for European Patent Application No. 17196924.9 dated Feb. 27, 2018.
Official Communication for European Patent Application No. 16194936.7 dated Mar. 9, 2017.

\* cited by examiner

*Primary Examiner* — Cam Y T Truong
(74) *Attorney, Agent, or Firm* — Hickman Becker Bingham Ledesma LLP

(57) ABSTRACT

A method is disclosed, comprising receiving, at a build service, an external dataset and an adaptor associated with the external dataset, the external dataset being in a format which is not managed by the build server. The method may also comprise querying the adaptor, by the build service, for information related to the external dataset. The method may also comprise receiving, at the build service, the information related to the external dataset; and causing, by the build service, the external dataset to be input into a build pipeline using the information related to the external dataset.

6 Claims, 10 Drawing Sheets

DATA ANALYTIC SYSTEMS

BENEFIT CLAIM

This application claims the benefit under 35 U.S.C. § 119 of European Patent Office application EP17196924.9, filed Oct. 17, 2017, the entire contents of which is hereby incorporated by reference as if fully set forth herein.

TECHNICAL FIELD

The disclosed embodiments relate generally to large-scale data analytic systems.

BACKGROUND

Many large-scale data analytic systems are designed to efficiently run large-scale data processing jobs. For example, a traditional large-scale data analytic system is configured to execute large-scale data processing jobs on a cluster of commodity computing hardware. Such systems can typically execute job tasks in parallel at cluster nodes at or near where the data is stored, and aggregate and store intermediate and final results of task execution in a way that minimizes data movement between nodes, which would be expensive operationally given the large amount of data that is processed. Such systems also typically store data and job results in distributed file system locations specified by users but do not provide extensive revision control management of data and job results.

Accordingly, the functionality of traditional large-scale data analytic systems is limited at least with respect to revision control of the data that is processed. Thus, there is a need for systems and methods that provide more or better revision control for data processed in large-scale data analytic systems. Such systems and methods may complement or replace existing systems and methods for data revision control in large-scale data analytic systems.

SUMMARY

A first aspect provides a method comprising: receiving, at a build service, an external dataset and an adaptor associated with the external dataset, the external dataset being in a format which is not managed by the build server; querying the adaptor, by the build service, for information related to the external dataset; receiving, at the build service, the information related to the external dataset; and causing, by the build service, the external dataset to be input into a build pipeline using the information related to the external dataset.

Querying the adaptor, by the build service, for information relating to the external dataset may comprise querying the adaptor for changes to the dataset since a previous data build was performed.

Querying the adaptor, by the build service, for information relating to the external dataset comprises may comprise querying the adaptor for a dataset title.

The method may further comprise the build service receiving a request from the adaptor for information relating to the most recent data build run by the build service; and in response thereto, providing, by the build server to the adaptor, the most recent data build run by the build service.

The adaptor may be specific to the format of the external dataset.

The adaptor may be specific to the external dataset.

A further aspect provides a method comprising: receiving a build request at a build service to perform a first data build; determining that the first data build is scheduled to be at least partially contemporaneous with a second data build; determining whether the first data build is compatible with the second data build; and if the first data build is compatible with the second data build, causing the first and second data builds to be executed at least partially concurrently.

The first data build may be determined to be incompatible with the second data build if the first data build and the second data build read and/or write to the same data objects.

The first data build may be determined to be compatible with the second data build if the first data build and the second data build read and/or write the same data object to the same dataset.

The first data build may be determined to be compatible with the second data build in response to a determination that the first data build and the second data build comprise shared subtrees that are identical.

If the first data build is compatible with the second data build, the method may comprise requesting a user input as to whether to cause the first and second data builds to be executed at least partially concurrently, and in response to a positive input, causing the first and second data builds to be executed at least partially concurrently.

The method may comprise, in response to a negative user input, causing the first and second data builds to be executed consecutively.

Causing the first and second data builds to be executed consecutively may comprise determining which of the first and second data builds has priority over the other data build.

A further aspect provides a computer program comprising computer readable instructions that, when executed by a computing apparatus, cause the computing apparatus to perform the method of any one preceding definition.

A further aspect provides an apparatus comprising one or more processors or special-purpose computing hardware configured to perform the method of any previous method definition.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DETAILED DESCRIPTION OF CERTAIN EMBODIMENTS

Figure 1:
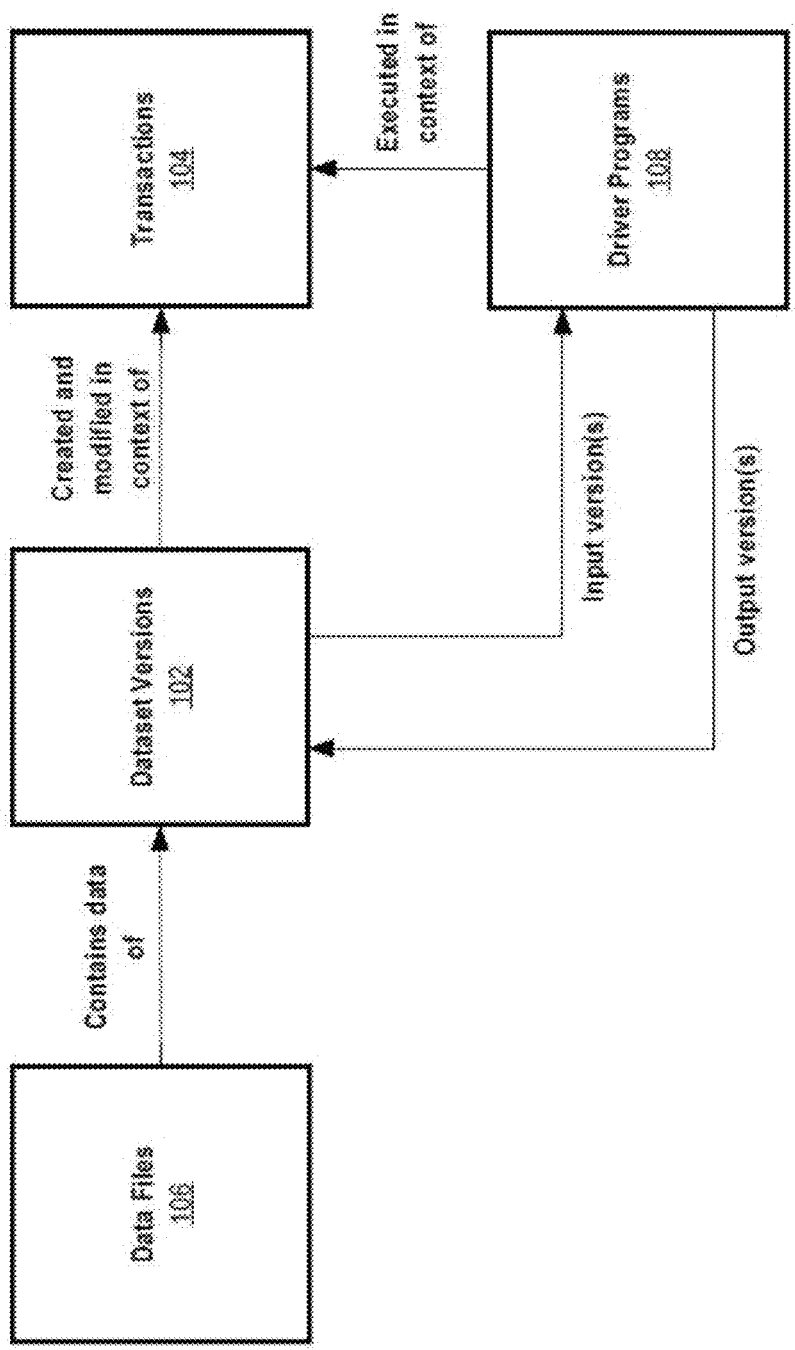
FIG. 1 is a data revision control model for large-scale data analytic systems.

Hitherto, systems used to perform data builds have only been able to build datasets created within the platform itself. Such datasets may thus be termed 'internal datasets'.

This means that a dataset not created within the platform (referred to herein as an external dataset) must be converted to a suitable format so that it is compatible with the build service of the platform. This makes importation of external datasets difficult.

Certain implementations described herein provide external datasets with a respective adaptor. The build service within the platform can interact with the adaptor to determine information about the external dataset, such as what changes have occurred to the dataset since the last build. The adaptor may be specific to the particular external dataset. As such, external datasets can be imported and built without the dataset being reformatted in accordance with the requirements of the build service.

In certain embodiments described herein, when two or more data builds are attempted simultaneously, the build service determines whether they are compatible. The notion of compatibility can be defined in different ways depending on the application. For example, two builds can be considered compatible if they are confluent, that is if the resulting output dataset are the same independently of the order in which the builds are executed. To determine whether builds are compatible in this sense, the build service can check which datasets are to be modified in each build. If the builds affect different datasets then both the builds are allowed to proceed. Two builds may be determined to be compatible if the shared subtrees are identical. As such, a system is provided that allows multiple builds to be performed concurrently without compromising the integrity of either build process.

This is in contrast to previous approaches whereby, during a data build, all datasets would be locked so that corruption of an intermediary dataset could not occur. This means that a user wishing to perform a build at the same time as first build is locked out.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram of a data revision control model 100 for large-scale data analytic systems. The model 100 generally includes dataset versions 102, transactions 104, data files 106, and driver programs 108. Datasets are versioned in the context of transactions 104. Specifically, each version 102 of a dataset corresponds to a different successfully committed transaction 104. In the context of a transaction 104 that creates a new dataset version 102, data may be added to a dataset if creating or revising the dataset and/or data may be removed from a dataset if revising the dataset. Data files 106 contain the data in datasets across dataset versions 102 including historical versions. Driver programs 108 are executed by large-scale data analytic systems (e.g., Apache Spark) in the context of transactions 104. When executed, driver programs 108 apply parallel operations to one or more input dataset versions 102 and produce as a result one or more output dataset versions 102.

Figure 2:
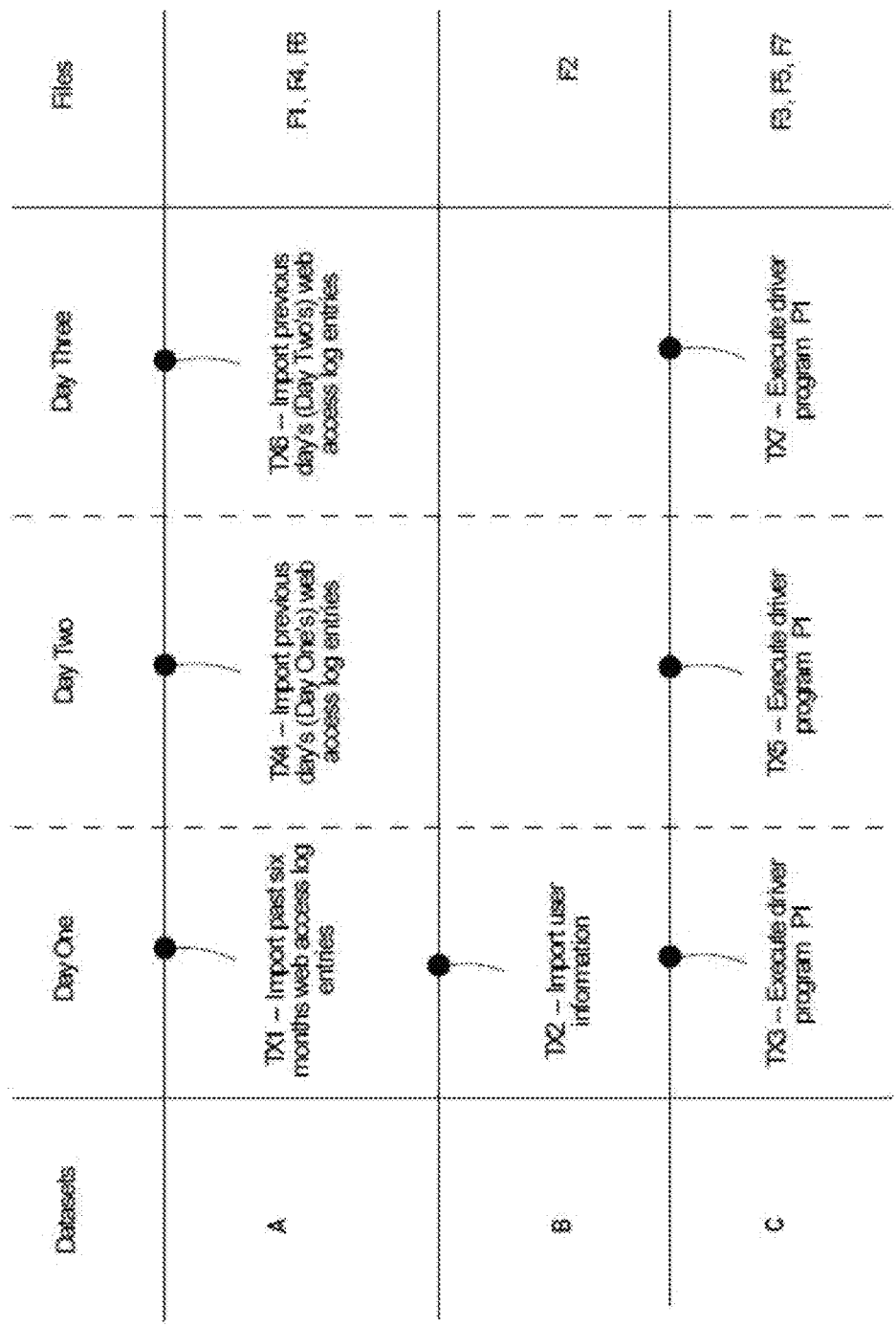
FIG. 2 illustrates a data revision control example according to the data revision control model.

A simple example may be helpful to better understand the data revision control model 100. FIG. 2 illustrates an example of data revision control according to data revision control model 100.

On Day One, an initial version of dataset A is created in the context of transaction TX1 resulting in data file F1. For example, data file F1 may contain web access log entries for the past six months. Also on Day One, an initial version of dataset B is created in the context of transaction TX2 resulting in data file F2. For example, data file F2 may contain rows corresponding to users of an online web service and associating user name identifiers with network addresses from which the users access the web service. Also on Day One, a driver program P1 is executed in the context of transaction TX3 that performs a join based on network address between dataset A, consisting of the initial version of dataset A, and dataset B, consisting of the initial version of dataset B. This execution results in an initial version of dataset C and data file F3 containing the results of the join operation executed in the context of transaction TX3.

On Day Two, the previous day's (i.e., Day One's) web access log entries are added to dataset A in the context of transaction TX4 thereby producing data file F4. In this example, data file F4 contains only the previous day's (i.e., Day One's) web access log entries. Also on Day Two, the driver program P1 is executed again in the context of transaction TX5. In this example, the join performed in the context of transaction TX5 is between the web access log entries in data file F4 and the entries in data file F2. This execution results in a second version of dataset C and data file F5 containing the results of the join operation executed in the context of transaction TX5.

Similarly, on Day Three, the previous day's (i.e., Day Two's) web access log entries are added to dataset A in the context of transaction TX6 and resulting in data file F6. In this example, data file F6 contains only the previous day's (i.e., Day Two's) web access log entries. Also on Day Two, the driver program P1 is executed again in the context of transaction TX7. In this example, the join performed in the context of transaction TX7 is between the web access log entries in data file F6 and the entries in data file F2. This execution results in a third version of dataset C and data file F7 containing the results of the join operation executed in the context of transaction TX7. As a result, there are three versions of dataset A corresponding to transactions TX1, TX4, and TX6 and data files F1, F4, and F6. There is one version of dataset B corresponding to transaction TX2 and data file F2. And there are three versions of dataset C corresponding to transactions TX3, TX5, and TX7 and data files F3, F5, and F7.

While in this example and other examples presented herein there is a single data file 106 created for a dataset version 102 in the context of a transaction 104, it is also possible for multiple data files 106 to be created for a dataset version 102. Thus, a transaction 104 in which a dataset version 102 is created or revised may be associated with the more than one data file 106.

Data Processing System

In order to explain the operation of data revision control in large-scale data analytic systems, it is helpful to consider an exemplary distributed data processing system in which the data revision control is performed. In general, the implementations described here can be performed by a set of interconnected processors that are interconnected by one or more communication networks.

Figure 3:
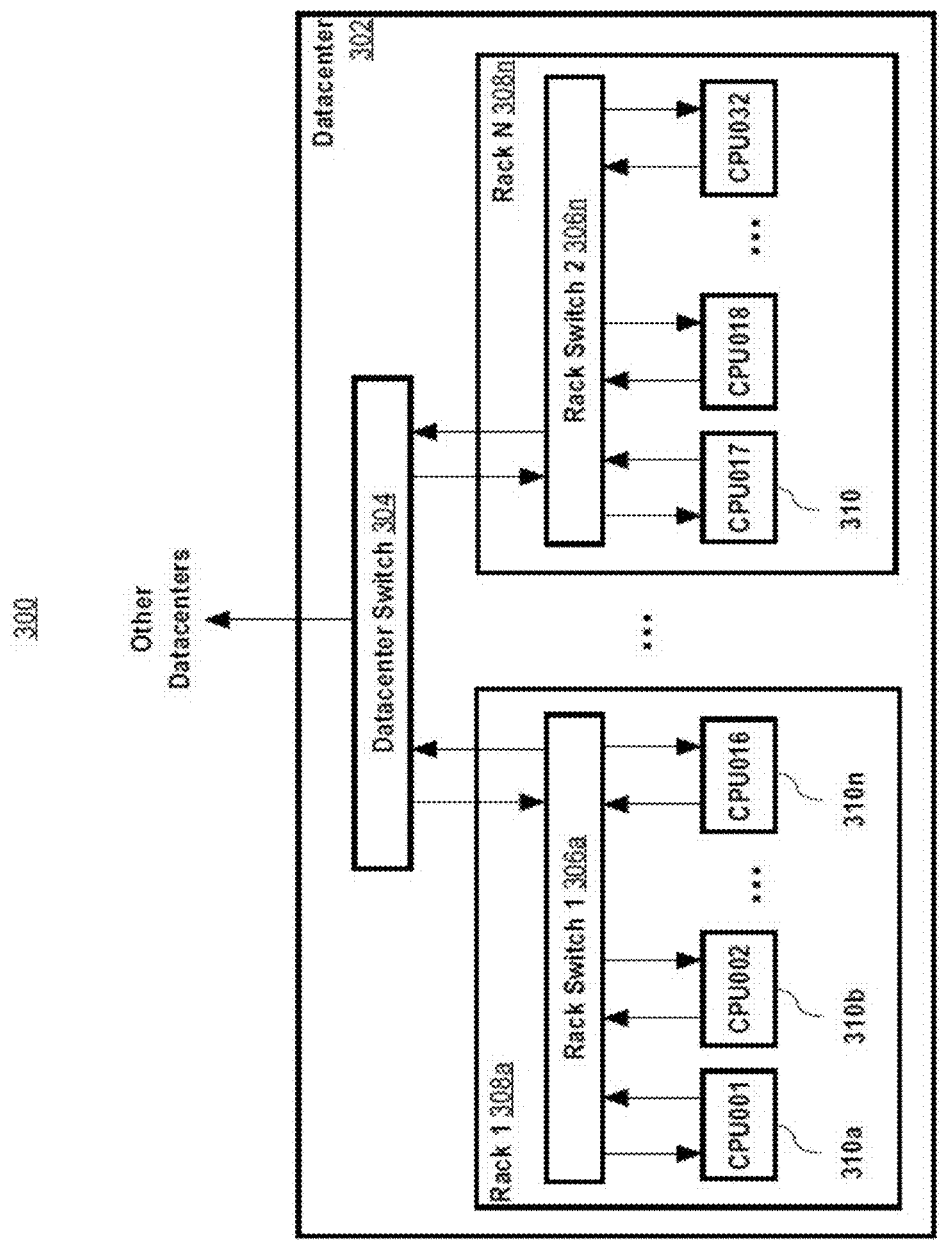
FIG. 3 is a block diagram of a data distribution network for data revision control in large-scale data analytic systems.

FIG. 3 is a block diagram of an exemplary distributed data processing system 300. It should be appreciated that the layout of the system 300 is merely exemplary and the system 300 may take on any other suitable layout or configuration. The system 300 is used to store data, perform computational tasks, and possibly to transmit data between datacentres. The system may include any number of data centres DCx, and thus the number of data centres shown in FIG. 3 is only exemplary. The system 300 may include dedicated optical links or other dedicated communication channels, as well as supporting hardware such as modems, bridges, routers, switches, wireless antennas and towers, and the like. In some implementations, the network 300 includes one or more wide area networks (WANs) as well as multiple local area networks (LANs). In some implementations, the system 300 utilizes a private network, e.g., the system and its interconnections are designed and operated exclusively for a particular company or customer. Alternatively, a public network may be used.

Some of the datacentres may be located geographically close to each other, and others may be located far from the other datacentres. In some implementations, each datacentre includes multiple racks. For example, datacentre 302 includes multiple racks 308a, ..., 308n. The racks 308 can include frames or cabinets into which components are mounted. Each rack can include one or more processors (CPUs) 310. For example, the rack 308a includes CPUs 310a, ..., 310n (slaves 1-16) and the nth rack 306n includes multiple CPUs 310 (CPUs 17-31). The processors 310 can include data processors, network attached storage devices, and other computer controlled devices. In some implementations, at least one of processors 310 operates as a master processor, and controls the scheduling and data distribution tasks performed throughout the network 300. In some implementations, one or more processors 310 may take on one or more roles, such as a master and/or slave. A rack can include storage (e.g., one or more network attached disks) that is shared by the one or more processors 310.

In some implementations, the processors 310 within each rack 308 are interconnected to one another through a rack switch 306. Furthermore, all racks 308 within each datacentre 302 are also interconnected via a datacentre switch 304. As noted above, the present invention can be implemented using other arrangements of multiple interconnected processors.

In another implementation, the processors shown in FIG. 3 are replaced by a single large-scale multiprocessor. In this implementation, data analytic operations are automatically assigned to processes running on the processors of the large-scale multiprocessor.

Example Large-Scale Data Analytic System

In order to explain the operation of data revision control in large-scale analytic systems, it is also helpful to consider an exemplary large-scale data analytic system with which data revision control is performed. In general, the implementations described here can be performed by a duster computing framework for large-scale data processing.

Figure 4:
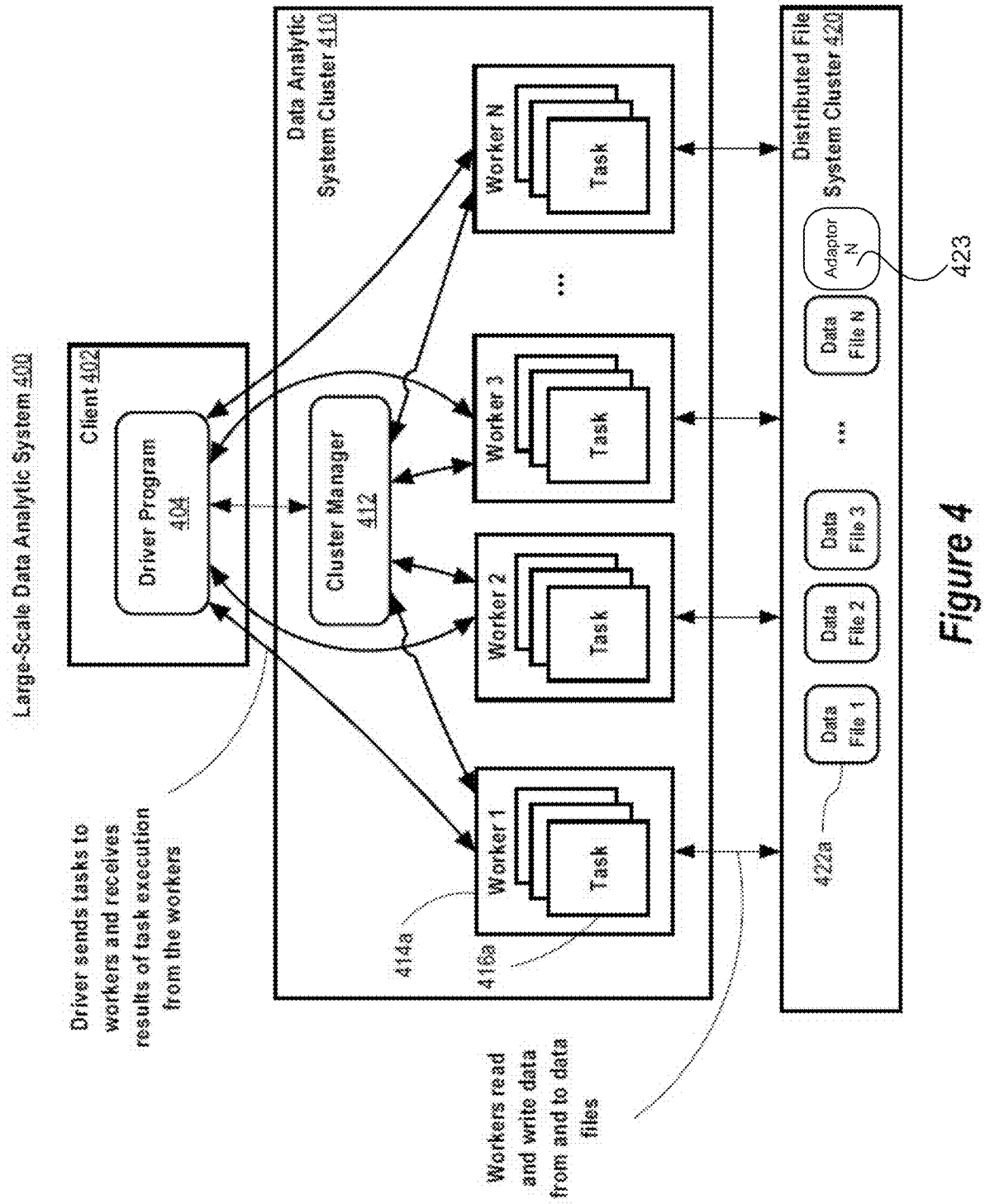
FIG. 4 is a block diagram of an example large-scale data analytic system.

FIG. 4 is a block diagram of an example large-scale data analytic system 400. The system 400 provides data analysts with a cluster computing framework for writing parallel computations using a set of high-level operators with little or no concern about work distribution and fault tolerance. The system 400 is typically a distributed system having multiple processors, possibly including network attached storage nodes, that are interconnected by one or more communication networks. FIG. 4 provides a logical view of a system 400, with which some implementations may be implemented on a system having the physical structure shown in FIG. 3. In one implementation, the system 400 operates within a single data centre of the system 300 shown in FIG. 3, while in another implementation, the system 300 operates over two or more data centres of the system 300.

As shown in FIG. 4, a client 402 of a data analytic system 410 includes a driver program 404. The driver program 404 is authored by a data analyst in a programing language (e.g., Java, Python, Scala, R, etc.) compatible with the data analytic system 410. The driver program 404 implements a high-level control flow of an analytic application (e.g., text search, logistic regression, alternating least squares, interactive analytics, etc.) and launches various operations in parallel at a set of worker machines 414. The parallel operations operate on a set or sets of data distributed across the set of workers 414.

Generally, a set of distributed data operated on by the parallel operations is a collection of objects partitioned across the set of workers 414. A set of distributed data may be constructed (instantiated) at the workers 414 from data in a data file 422 stored in a distributed file system cluster 420. Alternatively, a set of distributed data can be constructed (instantiated) at the workers 414 by transforming an existing set of distributed data using a parallel transformation operation (map, filter, flatMap, groupByKey, join, etc.). A set of distributed data may also be persisted as a data file 422 to the distributed file system cluster 420 by a parallel save operation. Other parallel operations that may be performed at the workers 414 on a set of distributed data include, but are not limited to, reduce, collect, and foreach. The reduce operation combines elements in a set of distributed data using associative function to produce a result at the driver program 404. The collect operation sends all elements of a set of distributed data to the driver program 404. The foreach operation passes each element of a set of distributed data through a user provided function. Overall, executing the driver program 404 can involve constructing (instantiated) sets of distributed data at the set of workers 414 based on data read from data files 422, constructing additional sets of distributed data at the set of workers 414 by applying transformation operations at the workers 414 to existing sets of distributed data, and persisting sets of distributed data at the workers 414 to data files 422 in the distributed file system duster 420.

In certain implementations, an adaptor 423 is stored in the distributed file system cluster 420. An adaptor 423 may be provided for each respective data file 422. Alternatively, an adaptor 423 may be provided for each type of data file 422. The adaptor 423 is a software application created for the one or more respective data files 422.

Cluster manager 412 provides a cluster operating system that lets the driver program 404 share the data analytic system cluster 410 in a fine-grained manner with other driver programs, possibly running at other clients. Cluster manager 412 also provides an application programming interface (API) invoke-able over a network by the driver program 404 via a network-based remote procedure call (RPC) protocol. In some implementations, the RPC protocol is based on the Hyper Text Transfer Protocol (HTTP) or the Secure-Hyper Text Transfer Protocol (HTTPS). The cluster manager 412 API allows the driver program 404 to request task execution resources at the workers 414. Generally, a task is a unit of work sent by the driver program 404 to an executor at a worker 414 for execution by the executor at the worker 414. Generally, an executor is a process launched for the driver program 404 at a worker 414 that executes tasks 416 sent to it by the driver program 404. The executor process runs tasks 416 and keeps data in memory or disk storage across tasks 416. In some implementations, the driver program 404 is allocated dedicated executor processes at the workers 414 so that tasks 416 performed by the executor processes on behalf of the driver program 404 are process-isolated from tasks performed at the workers 414 on behalf of other driver programs.

When an action (e.g., save, collect) is requested in the driver program 404, the driver program 404 may spawn a parallel computation job. After spawning the job, the driver program 404 may then divide the job into smaller sets of tasks 416 called stages that depend on each other. The tasks 416 may then be scheduled according to their stages and sent to the executors allocated to the driver program 404 by the cluster manager 412 for execution at the workers 414. Results of executing the tasks 416 at the workers 414 may be returned to the driver program 404 for aggregation and/or persisted to data files 422 in the distributed file system cluster 420.

The distributed data file system cluster 420 provides distributed data storage for data files 422 on a cluster of machines. The distributed data file system cluster 420 may present via an API a logical hierarchical file system to clients. With the cluster, data files 422 may be stored as data blocks distributed across machines of the cluster 420. In some implementations, copies of data blocks are stored at different machines of the cluster 420 for fault tolerance and redundancy.

The file system API for accessing, reading from, and writing to data files 422 may be invoke-able over a network from the client 402 including from the driver program 404 and from the workers 414 via a network-based remote procedure call (RPC) protocol. In some implementations, the RPC protocol is based on the HTTP or the HTTPS protocol. In some implementations, data files 422 are identified via the API by Uniform Resource Identifiers (URIs). The URI for a data file 422 may comprise a scheme and a path to the data file 422 in the logical file system. In some implementations, the scheme is optional. Where a scheme is specified, it may vary depending on the type of cluster 420. For example, if the cluster 420 is a Hadoop Distributed File System (RDFS) cluster, then the scheme of URIs for data files 422 may be "hdfs." More generally, the API offered by the cluster 420 may supported accessing, reading from, and writing to data files 422 using any Hadoop API compatible URI.

Data Revision Control System

Figure 5:
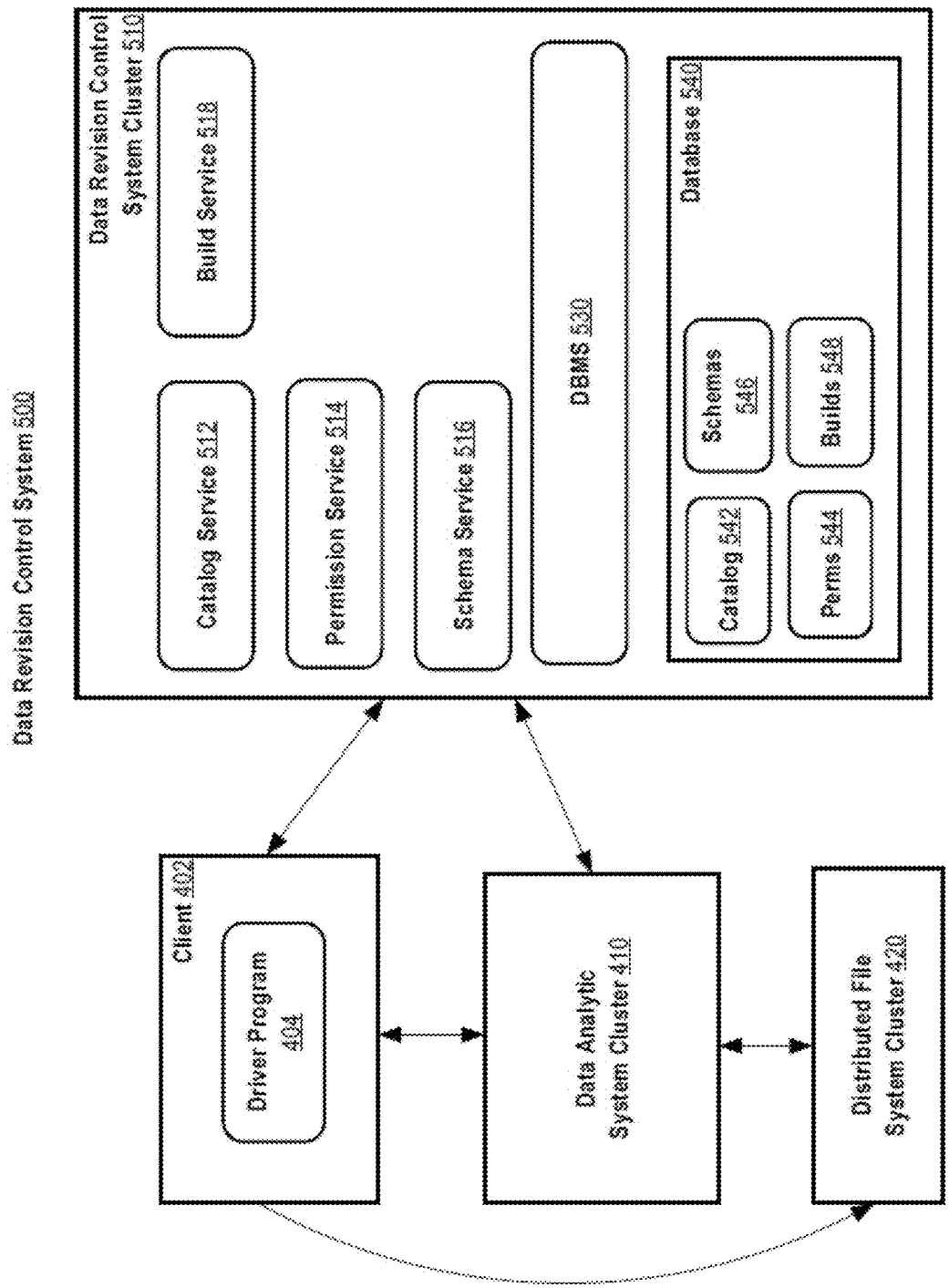
FIG. 5 is a block diagram of a data revision control system.

FIG. 5 is a block diagram of a data revision control system 500. The system 500 provides users of a large-scale data analytic system (e.g., system 400) with a system to record data and to capture information about transformations that transform one piece of data into another piece of data.

The system 500 includes a catalog service 512 that provides read and write access to a catalog 542 stored in a database 540. Access to the catalog 542 by the catalog service 512 may be conducted in the context of transactions 104 supported by a database management system 530.

When access to a dataset version 102 is requested of the catalog service 512 by a user, the catalog service 512 may ask a permission service 514 if the user has permission to access the dataset version 102 according to dataset permissions 544 stored in the database 540 and accessible via the database management system 530. If the user does not have access, then information in the catalog 542 such as transaction identifiers and file identifiers associated with the dataset 102 is not returned to the user.

The user may interface with the catalog service 512 via the client 402. The client 402 may be a command line-based or web-based. Via the client 402, the user may request the catalog service 512 for a particular dataset version 102, a particular transaction 104 of a dataset version 102, or a particular file 106 of a dataset version 102. If a particular dataset version 102, then the catalog service 512, assuming the user has permission to access the dataset version 102, returns a set of paths to all data files 106 for all transactions 104 of the dataset version 102 recorded in the catalog 542. If the request is for a particular transaction 104 of a dataset version 102, then the catalog service 512, again assuming the user has permission to access the dataset version 102, returns a set of paths to all data files 106 for the transaction 104 recorded in the catalog 542. If a particular data file 106 of a dataset version 102 is requested, then the catalog service 512, once again assuming the user has permission to access the dataset version 102, returns a path to the file 106 recorded in the catalog 542.

While in some implementations the user interfaces with the catalog service 512 and other services of the data revision control system 500 via a client specially configured to interface with services of the system 500, the user interfaces with a service or services of the data revision control system 500 via a generic client (e.g., a standard web browser) in other implementations. Thus, there is no requirement that client 402 be specially configured to interface with network services of the data revision control system 500.

The client 402 may be coupled to a distributed file system 420 where the files 106 are actually stored. The client 402 may use file paths returned from the catalog service 512 to retrieve the bytes of the files 106 from the distributed file system 420. The distributed file system 420 may be implemented the Hadoop Distributed File System (HFDS), Amazon S3 bucket, or the like.

The catalog service 512 or the client 402 may request schema information 546 for a particular dataset version 102 or a particular file 106 of a dataset version 102 from the schema service 516. The schema service 516 may verify that the requesting user has permission to the access the dataset version 102 first before providing the requested schema information to the catalog service 512 or the client 102. The schema service 516 may retrieve the schema information from the database 540 via the database management system 530.

The catalog service 512 may manage encryptions keys for supporting file-level encryption of files 106 stored in the distributed file system 420. Specifically, the catalog 542 may store user-provided symmetric encryption keys in association with file identifiers of files 106 that are encrypted using the encryption keys. Provided the user has permission to access a requested dataset version 102, the user-provided encryption keys may be returned to the client 402 along with the file paths in the catalog 542 to requested files 106 of the dataset 402. The client 402 can decrypt the encrypted bytes retrieved from the distributed file system 420 using the user-provided encryption key for the file 106. The user-provided encryption keys may be stored in the catalog 542 when the file 106 is initially created in the distributed file system 420.

The client 402 may be configured with an interface layer for processing user commands input via the command line or the web client and interacting with the catalog service 512, the permission service 514, the schema service 516, and the distributed file system 420 to carry out those commands. For example, via the command line interface, the user may input a "change dataset" command to set the current dataset version 102 of the command line session (shell). Then the user may input a list command to obtain a list of transactions 104 or files 106 of the current dataset version 102. The user may input a put command to add a specified file 106 to the dataset version 102. Behind the scenes, the interface layer negotiates with the catalog service 512, the permission service 514, the schema service 516, and the distributed file system 420 to carry out the commands.

The interface layer may also exist on worker nodes 141 of the data analytic system cluster 410. For example, the interface layer may also exist on Spark worker nodes such that when the worker nodes perform transformations 108 on dataset versions 102, the interface layer negotiates with the services 512, 514, 516, and/or 518 to facilitate the transformations 108.

Catalog

The data revision control system 500 may encompass maintaining an immutable history of data recording and transformation actions such as uploading a new dataset version 102 to the system 500 and transforming one dataset version 102 version to another dataset version 102. The immutable history is referred to herein as the catalog 542. The catalog 542 may be stored in a database 540. Preferably, reads and writes from and to the catalog 542 are performed in the context of ACID-compliant transactions supported by a database management system 530. For example, the catalog 542 may be stored in a relational database managed by a relational database management system that supports atomic, consistent, isolated, and durable (ACID) transactions. In one embodiment, the database management system 530 supporting ACID transactions is as described in related U.S. patent application Ser. No. 13/224,500, entitled "Multi-Row Transactions," filed Sep. 2, 2011, the entire contents of which is hereby incorporated by referenced as if fully set forth herein.

Versioned Immutable Datasets

The catalog 542 encompasses the notion of versioned immutable dataset versions 102. More specifically, a dataset may encompass an ordered set of conceptual dataset items. The dataset items may be ordered according to their version identifiers recorded in the catalog 542. Thus, a dataset item may correspond to a particular dataset version 102. Or as another perspective, a dataset item may represent a snapshot of the dataset at a particular dataset version 102.

As a simple example, a version identifier of '1' may be recorded in the catalog 542 for an initial dataset version 102. If data is later added to the dataset, a version identifier of '2' may be recorded in the catalog 542 for a second dataset version 102 that conceptually includes the data of the initial dataset version 102 and the added data. In this example, dataset version '2' may represent the current dataset version 102 version and is ordered after dataset version '1'.

As well as being versioned, a dataset version 102 may be immutable. That is, when a new dataset version 102 is created in the system 500, pre-existing dataset versions 102 are not overwritten by the new dataset version 102. In this way, pre-existing dataset versions 102 are preserved when a new dataset version 102 is added to a dataset. Note that supporting immutable dataset versions 102 is not exclusive of pruning or deleting dataset versions 102 corresponding to old or unwanted dataset versions 102. For example, old or unwanted dataset versions 102 may be deleted from the system 500 to conserve data storage space or in accordance with a data retention policy or regulatory compliance.

Dataset Transactions

A dataset version 102 may correspond to a successfully committed transaction 104. In these embodiments, a sequence of successfully committed transactions 104 may correspond to a sequence of dataset versions 102.

A transaction 104 against a dataset may add data to the dataset, edit existing data in the dataset, remove existing data from the dataset, or a combination of adding, editing, or removing data. A transaction 104 against a dataset may create a new dataset version 102 without deleting, removing, or modifying pre-existing dataset versions.

A successfully committed transaction 104 may correspond to a set of one or more files 106 that contain the data of a dataset version 102 created by the successful transaction 104. The set of files 106 may be stored in a file system 420. In a preferred embodiment, the file system 420 is the Hadoop Distributed File System (HDFS) or other distributed file system 420. However, a distributed file system 420 is not required and a standalone file system may be used.

In the catalog 542, a dataset version 102 may be identified by the name or identifier of the dataset version 102. In a preferred embodiment, the dataset version 102 corresponds to an identifier assigned to the transaction 104 that created the dataset version 102. The dataset version 102 may be associated in the catalog with the set of files 106 that contain the data of the dataset version 102. In a preferred embodiment, the catalog 542 treats the set of files 106 as opaque. That is, the catalog 542 itself may store paths or other identifiers of the set of files 106 but may not otherwise open, read, or write to the files 106.

In sum, the catalog 542 may store information about dataset versions 102. The information may include information identifying different dataset versions 102. In association with information identifying a particular dataset version 102, there may be information identifying one or more files 106 that contain the data of the particular dataset version 102.

Dataset Branching

The catalog 542 may store information representing a non-linear history of a dataset.

Specifically, the history of a dataset may have different dataset branches. Branching may be used to allow one set of changes to a dataset to be made independent and concurrently of another set of changes to the dataset. The catalog 542 may store branch names in association with identities of dataset versions 102 for identifying dataset versions 102 that belong to a particular dataset branch.

Dataset Provenance

The catalog 542 may provide dataset provenance at the transaction level of granularity. As an example, suppose a driver program 108 is executed in the data analytic system 400 multiple times that reads data from a version of dataset A, reads data from a version of dataset B, transforms the data from the version of dataset A and the data from the version of dataset B in some way to produce a version of dataset C. As mentioned, this transformation may be performed multiple times. Each transformation may be performed in the context of a transaction 104. For example, the transformation may be performed daily after datasets A and B are updated daily in the context of transactions. The result being multiple versions of dataset A, multiple versions of dataset B, and multiple versions of dataset C as a result of multiple executions of the driver program 108. The catalog 542 may contain sufficient information to trace the provenance of a particular version of dataset C to the versions of datasets A and B from which the particular version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog 542 for a transaction 104 that creates a new dataset version 102, the transaction 104 or transactions 104 that the given transaction 104 depends on (e.g., is derived from). The information recorded in the catalog 542 may include an identifier of each dependent transaction 104 and a branch name of the dataset version 102 that the dependent transaction 104 was committed against.

According to some embodiments, provenance tracking extends beyond transaction level granularity to column level granularity. For example, suppose a dataset version A1 is structured as a table of two columns and a dataset version B1 is structured as a table of five columns. Further assume, column three of dataset version B1 is computed from column one of dataset version A1. In this case, the catalog may store information reflecting the dependency of column three of dataset version B1 on column one of dataset version A1.

Build Service

The system 500 may encompass a build service 518 that manages driver programs 108 which are executed in the analytic system 400 to transform data. The build service 518 may leverage a directed acyclic graph data structure to ensure that driver programs 108 are executed in proper dependency order. The graph may encompass a node representing an output dataset to be computed based on one or more input datasets each represented by a node in the graph with a directed edge between node(s) representing the input dataset(s) and the node representing the output dataset. The build service 518 traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The build service 518 may maintain build dependency data 548 representing one or more directed acyclic graphs (also referred to herein as a "build dependency graph"). There may be multiple such graphs if, for example, none of the datasets represented by a graph has a build dependency on a dataset represented by another graph. Each graph comprises nodes and one or more directed edges connecting the nodes. A leaf node of a graph corresponds to a dataset that does not have any build dependencies on another dataset. A non-leaf node of a graph corresponds to a dataset that has a build dependency on at least one other dataset. A root node of a graph is a non-leaf node but where there are no build dependencies on the dataset represented by the root node. A graph may have only one root node or may have multiple root nodes. A directed edge connecting two nodes in a graph represents a build dependency between two datasets. A graph may be represented in a computer memory as an N-ary tree data structure or other suitable data structure.

Figure 9:
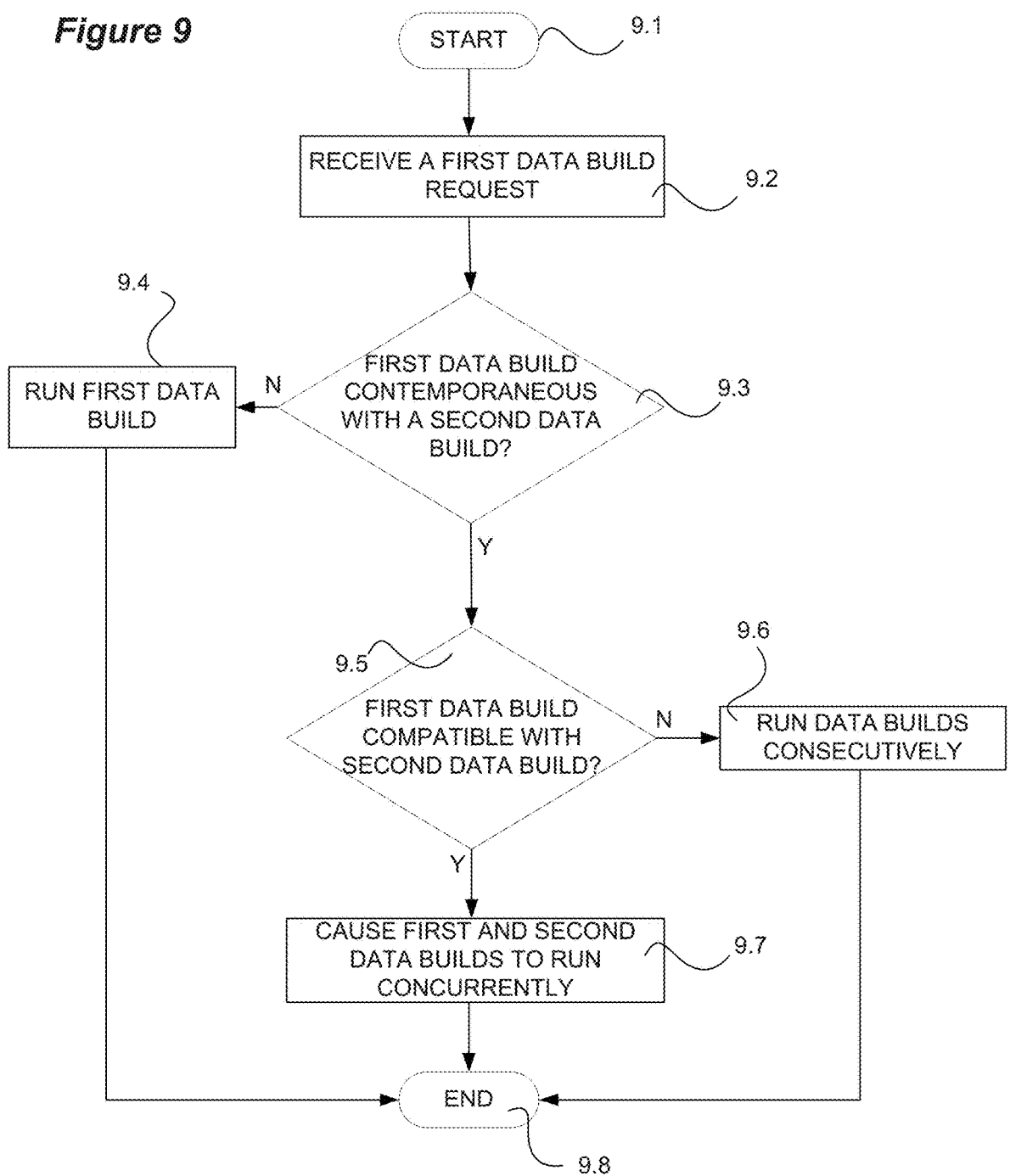
FIG. 9 is a generalised flow diagram of processing operations that may be performed by the data revision control system according to example embodiments.

To illustrate a build dependency graph by a simple example, consider graph 900 of FIG. 9. Each circle of graph 900 represents a node of the build dependency graph and each arrow connecting two circles of graph 900 represents a directed edge of the build dependency graph. The letter in each circle of graph 900 represents the name of the dataset represented by the corresponding node. As shown, datasets F and A are represented by root nodes of the build dependency graph, datasets C, D, and E are represented by leaf nodes of the build dependency graph, and dataset B is represented by a non-leaf node of the build dependency graph. Also shown, dataset F has a build dependency on dataset C, dataset B has build dependencies on datasets C and D, and dataset A has build dependencies on datasets B, C, D, and E. Dataset A's build dependency on dataset C is transitive by way of dataset B. Datasets F and B may be considered the "parent" datasets of dataset C (and dataset C the "child" of datasets F and B), datasets B and A the parent datasets of dataset D (and dataset D the child of datasets B and A), and dataset A the parent dataset of datasets B, D, and E (and datasets B, D, and E the children of dataset A). However, dataset A is not considered a parent of dataset C and dataset C is not considered a child of dataset A.

To determine whether a given dataset is out-of-date with respect to its build dependencies, the build service 518 traverses the build dependency graph starting at the node corresponding to the given dataset and visits at least every non-leaf node in the graph sub-tree that is rooted at the node corresponding to the given dataset. During the traversal, nodes are visited in post-order according to a depth-first traversal algorithm. For example, referring briefly to FIG. 9, if the given dataset is A, then a post-order depth-first recursive traversal of graph 900 would visit the node for dataset C and the node for dataset D before visiting the node for dataset B and would visit the node for dataset D and the node for dataset E before visiting the node for dataset A.

For each non-leaf node visited during the traversal, a determination is made whether the current version of the dataset corresponding to the visited non-leaf node is out-of-date with respect to any of its child datasets. To determine whether the current version of a dataset is out-of-date with respect to a child dataset, the build service 518 may consult the catalog 542 by way of the catalog service 512. If the current version of the dataset is out-of-date with respect to any of its child datasets, then the build service 518 executes the current version of the driver program for the dataset to generate a new version of the dataset. After the new version of the dataset has been generated, the build service 518 adds a new entry to the catalog 542 reflecting the new version of the dataset. In an embodiment, datasets are recursively rebuilt if dependencies of the dataset to be rebuilt are also out-of-date.

Build Service Branches

Build service branches allow the same driver program 108 to be executed on multiple branches. For example, a driver program 108 on the master branch can be executed to produce a dataset version 102 on the master branch or on another branch (e.g., the develop branch). Build server branches also allow a driver program 108 on a branch to be executed to produce dataset versions 102 on that branch. For example, a driver program 108 on the develop branch can be executed to produce a dataset version 102 that is available only on the develop branch. Build server branches provide isolation of re-computation of graph data across different users and across different execution schedules of a data pipeline. To support branching, the catalog 542 may store information represents a graph of dependencies as opposed to a linear dependency sequence.

Build Fallbacks

The build service may support build fallbacks between branches. For example, suppose the system stores two "raw" datasets A and B that are both updated daily (e.g., with daily web log data for two web services). Each update creates a new version 102 of the dataset and corresponds to a different transaction 104. The datasets are deemed raw in the sense that a driver program 108 is not executed by the analytic system 400 to produce versions 102 of the datasets versions of the datasets.

Further suppose there is a driver program 108 that computes a join between datasets A and B. The join may be performed in a data transformation system such a SQL database system or Apache Spark, for example. More generally, the techniques described herein are agnostic to the particular analytic system that is used. The data to be transformed and the driver program 108 to transform the data can be provided to the analytic system 400 based on information stored in the catalog 542 including where to store the output data.

If the driver program P1 is executed on the master branch, it may produce an output dataset version 102 also on the master branch. Here, the dataset version 102 may be considered a "derived" dataset version 102 because it is derived from one or more other dataset versions 102. Further suppose there is another driver program P2 on the master branch that filters the data in a dataset version 102 and produces a filtered dataset version 102, also on the master branch. Now suppose a new branch called "develop" is created that includes a modification of driver program P2. The modification is stored in the system 500 as a new version of the driver program P2 on the develop branch. For example, the new version of the driver program P2 may apply the filter operation of the prior version of the driver program P2 in a different way.

When requested to build a target branch that is branched from another parent branch, the build service 518 may fall back to the parent branch when a necessary input dataset version 102 is not present on the target branch. For example, if requested to bring the develop branch up to date in the example above, the build service 518 may fallback to providing a dataset version 102 on the master branch as input to a version of a driver program 108 on the develop branch to produce a filtered dataset version 102 on the develop branch.

The catalog 542 may store parent-child and fallback relationships between branches.

For example, the develop branch in the example above is a child of the master branch. Another branch, for example an "experimental" branch, may be a further child of the develop branch and so on. As in the above example, when the build service 518 is requested to build a branch that is a child of another branch, the build service 518 may identify a parent dataset version 102 or a parent version of a driver program 108 from a parent branch if no parent version of a dataset or no parent version of the driver program 108 exists on the target child branch. This identification may be recursive if the identification cannot be made on the parent branch and the parent branch is a child branch of another branch and so on.

Thus, the build service 518 supports GIT-style branching for both data and code.

Builds

In a command to the build service 518 to build a branch, the build service may accept as a parameter to the command, a target driver program 108. For example, in an example pipeline on the master branch involving datasets A, B, C, and D and driver programs P1 and P2 where driver program P1 builds the current versions of dataset C from the current versions of datasets A and B and driver program P2 builds the current version of dataset D from the current version of dataset C, the driver programs P1 or P2 may be specified as the target. For example, if driver program P2 is specified as the target, then the build service may read and process data in the catalog 542 to determine whether a transaction 104 updating any of dataset A, dataset B, and driver program P1 has committed since the transaction 104 produced the current version of dataset C was committed. If not, then dataset C is up-to-date, otherwise dataset C is out-of-date.

If dataset C is out-of-date, then the build service rebuilds dataset C to create a new current version of dataset C based on the current versions of datasets A and B and the current version of driver program P1. If dataset C is already up-to-date or after dataset C is brought up-to-date, the build service generates a new version of dataset D based on the now current version of dataset C and driver program P2.

In some embodiments, the status of a current build can be displayed on a status page.

In some embodiments, running a data build may be a permissioned operation. For example, the system may be configured so that only users having administrator status are allowed to build from datasets. Temporal constraints may also be provided to provide permissions over a particular time period, for example between 6 am and 8 am. Such temporal constraints may be combined with other user permissions to form compound constraints. An example of a compound constraint may be that only users having administrator status can change datasets between 6 am and 8 am.

In some embodiments, it is possible to have data builds that lead to multiple outputs. For example, a transformation may occur in a machine learning pipeline. An input of test data may be split into a training dataset and a testing dataset. Alternatively, customer data may be split up on a geographic basis, for example between the US and Europe.

In previous approaches, if an intermediate transformation in a data build failed the entire data build would fail. In certain embodiments, a user can prioritise between data correctness and instructing the pipeline to run. As such, a user may choose what strategy to use during configuration of the build.

Build Catalog

Figure 10:
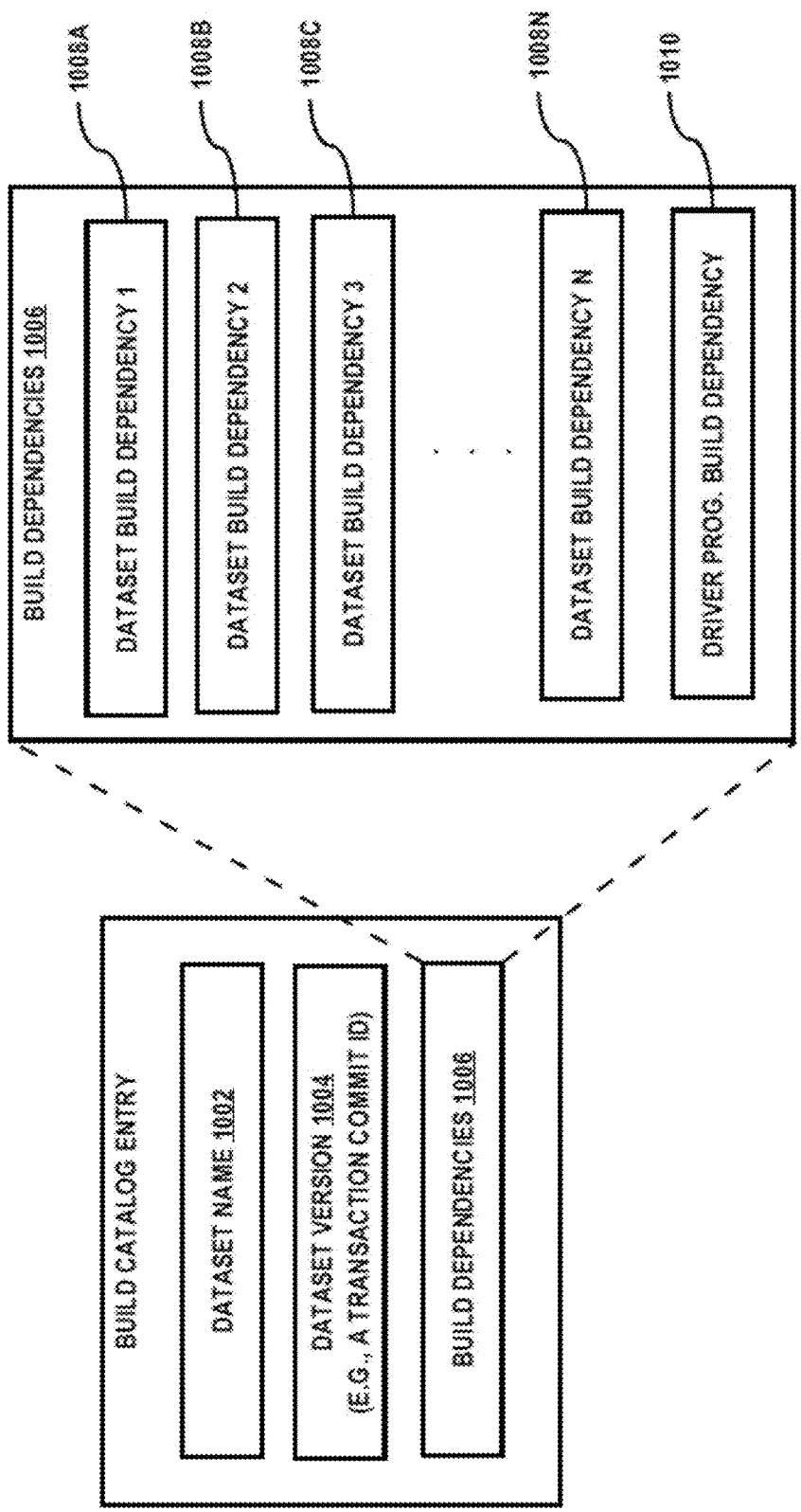
FIG. 10 is a block diagram of a build catalog entry according to an embodiment.

According to some embodiments of the present invention, builds data 548 may encompass a build catalog for tracking builds orchestrated by the build service 514. In an embodiment, as exemplified in FIG. 10 an entry in the build catalog corresponding to a non-leaf node in a build dependency graph may comprise a dataset name 1002, a dataset version 1004, and build dependency information 1006. An entry may also comprise a build branch name if the target of a build is a particular branch. Build service 518 adds a new build catalog entry to the build catalog each time a new version of a dataset is built and committed in the context of a transaction 104 facilitated by the build service 518. Thus, the build catalog may store a build catalog entry for each version of a dataset, including the current version of the dataset and any historical (prior) versions of the dataset.

The dataset name 1002 may be a unique identifier of a dataset. The dataset name 1002 may be used to identify the dataset across all versions of the dataset. In other words, the dataset name 1002 may be the same in all build catalog entries for all versions of the dataset.

The dataset version 1004 is a unique identifier of a version of the dataset. Typically, the dataset version 1004 is an ordinal or other information that can be used to determine whether the version of the dataset represented by the dataset version 1004 happened before or happened after other versions of the dataset represented by other build catalog entries in the build catalog with the same dataset name 1002.

In an embodiment, the dataset version 1004 is an identifier (e.g., a transaction commit identifier) assigned by the DBMS 530 to a commit of a transaction that stored the version 1004 of the dataset.

The build dependencies 1006 may comprises a list of one or more dataset build dependencies 1008 and a driver program build dependency 1010. The list of dataset build dependencies 1008 correspond to any child datasets input to the version of the derivation program used to build the version 1004 of the derived dataset. If no such datasets were input, then the list of dataset build dependencies 1008 may be an empty list.

In an embodiment, each dataset build dependency (e.g., 1008A) specifies the name and the version of a dataset that the version 1004 of the derived dataset was built (generated) from. For example, the name and the version of a dataset build dependency (e.g., 1008B) may correspond to a dataset name 1002 and a dataset version 1004 of a build catalog entry for a version of a dataset that the version 1004 of the derived dataset was generated (built) from.

In an embodiment, the derivation program build dependency 1010 specifies the name and the version of a driver program 108 that the build service 518 executed to generate (build) the version 1004 of the derived dataset. For example, the name and the version of the derivation program dependency 1010 may correspond to a derivation program entry for the version of the derivation program that was executed by the build service 518 to generate (build) the version 1004 of the derived dataset.

In an embodiment, the build service 518 identifies the current version of a derived dataset by querying build catalog entries for the build catalog entry comprising the latest (most recent) dataset version 1004 and having a dataset name 1002 matching a name for the derived dataset specified as a query parameter.

In an embodiment, the build service 518 determines whether the current version of a given dataset is out-of-date based on the build catalog entry for the current version of the given dataset. The current version of the given dataset may be considered out-of-date for any one of a number of reasons including because: 1) there is a version of the driver program 108 that is newer than the version used to build the current version of the given dataset, 2) there is a version of a child dataset that is newer the version of the child dataset from which the current version of the given dataset was built, or 3) a dependency of the given dataset on another dataset was added or removed.

Schema Metadata Service

The system 500 encompass a schema metadata service 516 that stores schema information about files 106 that correspond to transactions 104 reflected in the catalog 542. The schema information may encompass metadata related to a dataset, dataset version, a transaction, or a branch. An identifier of a given file 106 identified in the catalog 542 may be passed to the schema metadata service 516 and the schema metadata service 516 may return schema information for the file 106. The schema information may encompass data schema related information such as whether the data in the file 106 is structured as a table, the names of the columns of the table, the data types of the columns, user descriptions of the columns, etc.

The schema information accessible via the schema metadata service 516 may versioned separately from the data itself in the catalog 542. This allows the schemas to be updated separately from datasets 102 and those updates to be tracked separately. For example, suppose a comma separated file is uploaded to the system 500 as particular dataset version. The catalog 542 may store in association with the particular dataset version identifiers of one or more files 106 in which the CSV data is stored. The catalog 542 may also store in association with each of those one or more file identifiers, schema information describing the format and type of data stored in the corresponding file 106. The schema information for a file 106 may be retrievable via the schema metadata service 516 given an identifier of the file 106 as input. Note that this versioning scheme in the catalog 542 allows new schema information for a file 106 to be associated with the file 106 and accessible via the schema metadata service 516. For example, suppose after storing initial schema information for a file 106 in which the CSV data is stored, updated the schema information is stored that reflects a new or better understanding of the CSV data stored in the file 106. The updated schema information may be retrieved from the schema metadata service for the file 106 without having to create a new version of the CSV data or the file 106 in which the CSV data is stored.

When a transformation 108 is executed, the build service 516 may encapsulate the complexities of the separate versioning of datasets and schema information. For example, suppose driver program P1 accepts dataset A and dataset B as input is the target of a build command issued to the build service 518. In response to this build command, the build service 518 may determine from the catalog 542 the file 106 or files 106 in which the data of the current versions of datasets A and B is stored. The build service 518 may then access the schema metadata service 516 to obtain the current versions of the schema information for the file 106 or files 106. The build service 518 may then provide all of identifiers or paths to the file 106 or files 106 and the obtained schema information to the analytic system 400 (e.g., Apache Spark) to execute the driver program P1. The underlying data transformation engine interprets the schema information and applies it to the data in the file 106 or files 106 when executing the transformation A.

Basic Computing Device

Figure 6:
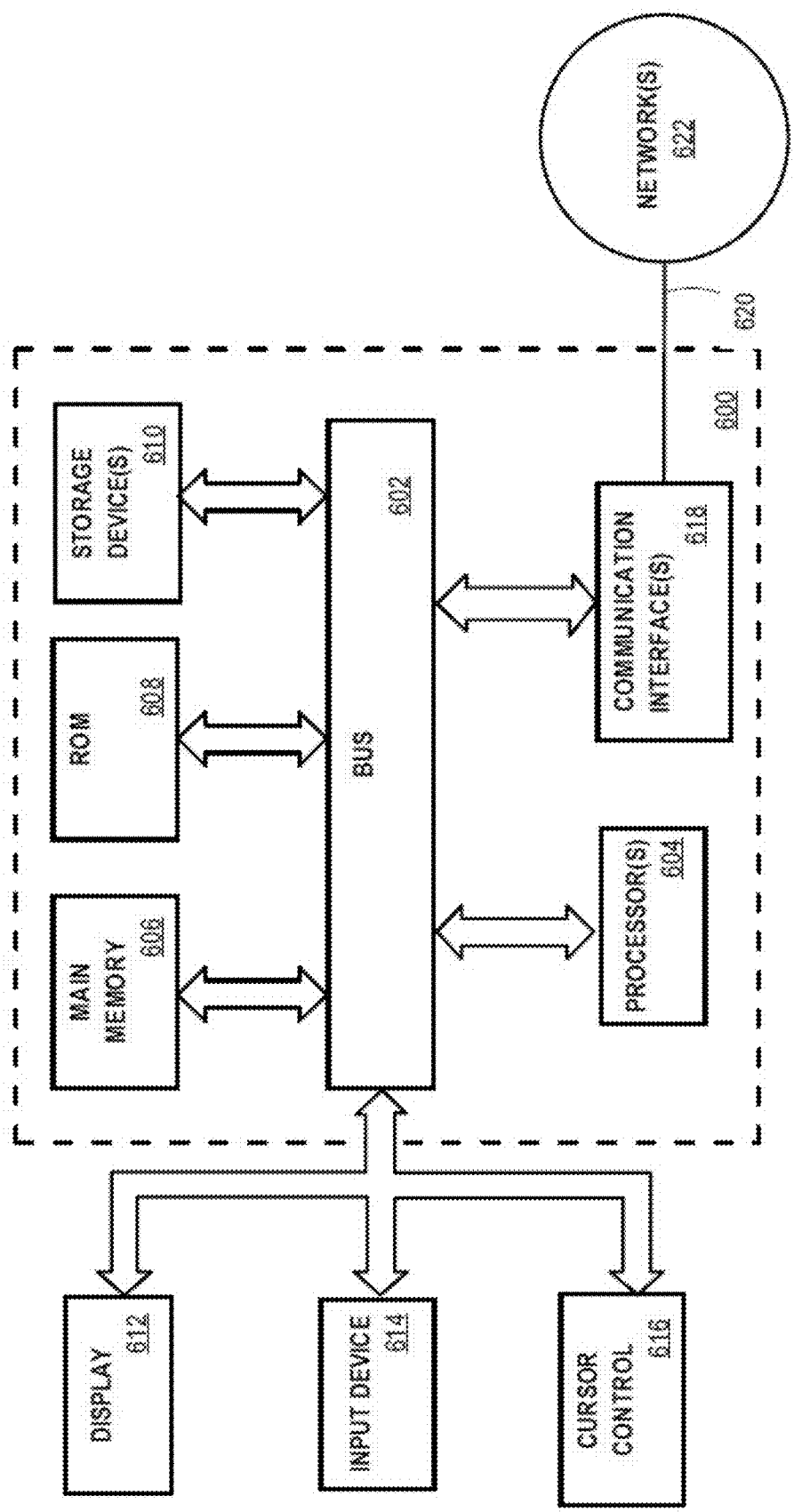
FIG. 6 is a very general block diagram of a computing device in which the example embodiment(s) may be embodied.

Referring now to FIG. 6, it is a block diagram that illustrates a basic computing device 600 in which the example embodiment(s) of the present invention may be embodied.

Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general-purpose microprocessor, a system on a chip (SoC), or other processor.

Main memory 606, such as a random-access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fibre optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the worldwide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Basic Software System

Figure 7:
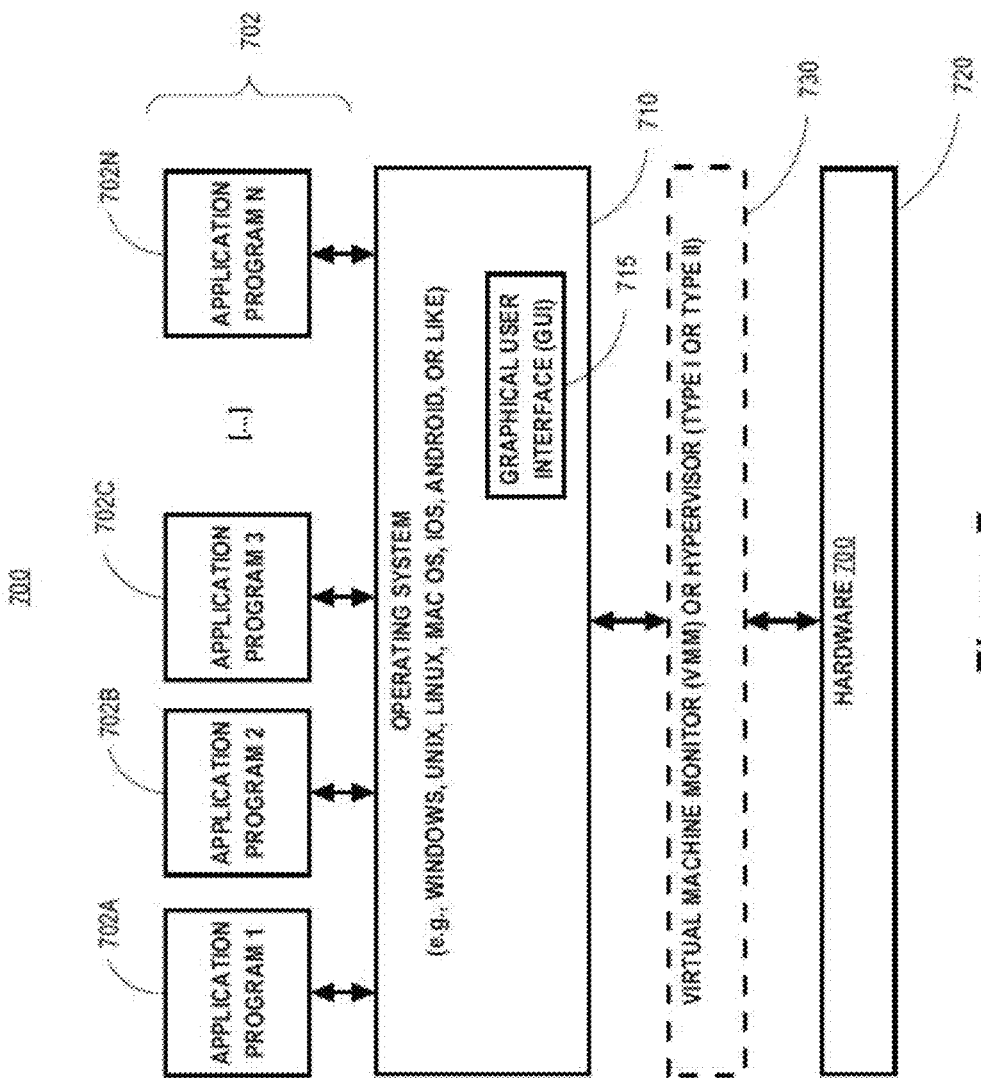
FIG. 7 is a block diagram of a basic software system for controlling the operation of the computing device.

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600.

Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same Revision of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

Figure 8:
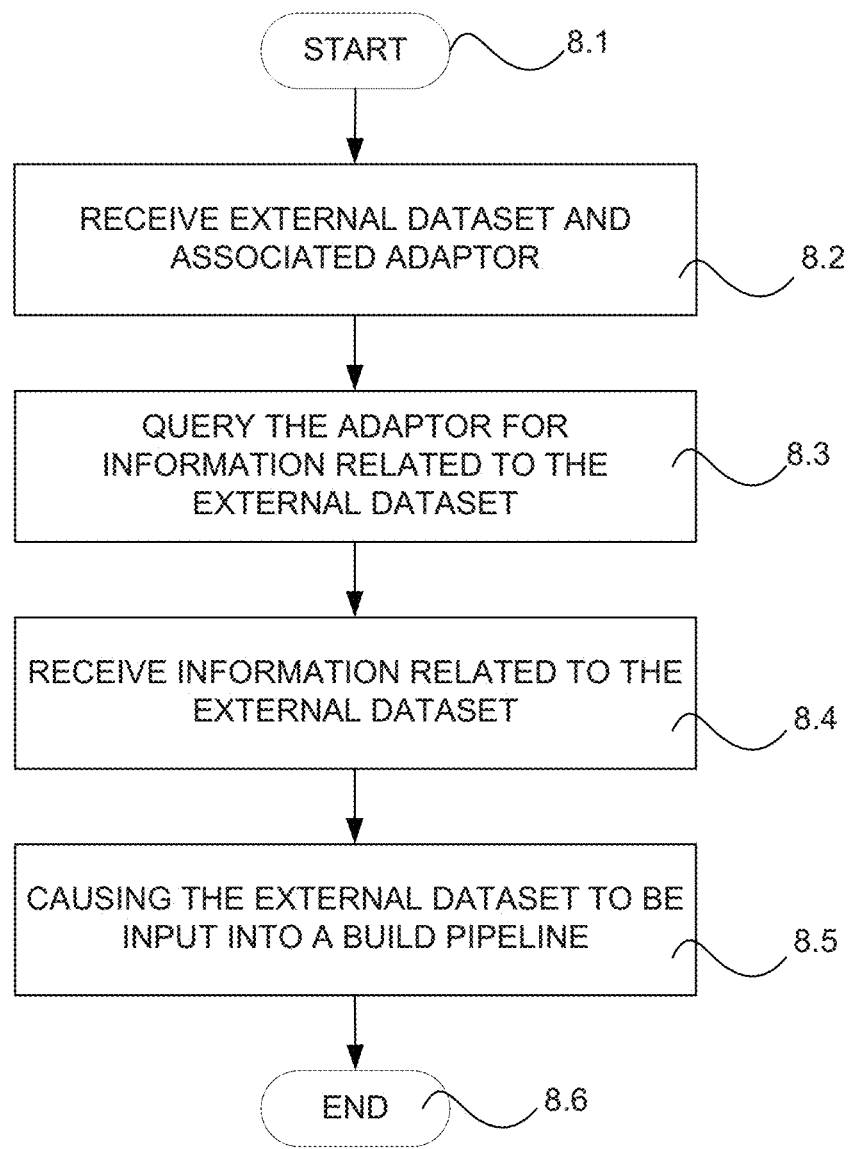
FIG. 8 is a generalised flow diagram of processing operations that may be performed by a data revision control system according to example embodiments.

FIG. 8 is a generalised flow diagram of processing operations that may be performed by the data revision control system 500.

The set of operations starts at operation 8.1.

At operation 8.2, the build service 518 receives an external dataset and an adaptor associated with the external dataset. The external dataset is in a format which is not managed by the build service.

At operation 8.3, the build service 518 queries the adaptor for information related to the external dataset. The information related to the external dataset may include metadata of the dataset. The information related to the external dataset may include information relating to changes to the dataset since a previous data build was performed. The information related to the external dataset may include a dataset title.

The adapter may provide one or more of the following: information indicating a version of data used in a previous build, a version of the transformation code used to run the previous build, runtime parameters for the previous build, or data schema used in the previous build.

At operation 8.4, the build service 518 receives the information related to the external dataset requested from the adaptor.

At operation 8.5, the build service 518 causes the external dataset to be input into a build pipeline using the information related to the external dataset.

In some implementations, the build service 518 may receive a request from the adaptor for information relating to the most recent data build run by the build service 518. The build service 518 may then provide the requested information to the adaptor. The information requested by the adaptor may be the most recent data build run by the build service 518.

FIG. 9 is a generalised flow diagram of processing operations that may be performed by the data revision control system 500. The operations begin at operation 9.1.

At operation 9.2, the build service 518 receives a build request to perform a first data build.

At operation 9.3, the build service 518 determines whether the first data build is scheduled to be at least partially contemporaneous with another data build being performed or to be performed by the build service 518. If the build request to perform the first data build specifies that the first data build is to be performed immediately, the build service 518 may determine that the first data build is scheduled to be at least partially contemporaneous with another data build by determining that another data build is currently underway. For data builds scheduled in the future, the build service 518 may compare a build start time of a first data build and a second data build.

If the first data build is not at least partially contemporaneous with another data build then the process moves on to operation 9.4 and the data build is run.

If the first data build is at least partially contemporaneous with another data build then the process moves on to operation 9.5. At operation 9.5, the build service 518 determines whether the first data build is compatible with the second data build. The first data build may be determined to be incompatible with the second data build if the first data build and the second data build read and/or write to the same data objects with different input data versions, code versions, or build parameters. Alternatively, the first data build may be determined to be compatible with the second data build if the first data build and the second data build read and/or write the same data object to the same dataset. Alternatively, the first data build may be determined to be compatible with the second data build in response to a determination that the first data build and the second data build comprise shared subtrees that are identical.

If the first data build is not compatible with the second data build, at operation 9.6, the build service 518 causes the first and second data builds to be executed consecutively.

If the first data build is compatible with the second data build, at operation 9.7, the build service 518 causes the first and second data builds to be executed at least partially concurrently.

In some implementations, if the first data build is compatible with the second data build, a user interface may be displayed to the user requesting a user input as to whether to cause the first and second data builds to be executed at least partially concurrently. In response to a positive input, the first and second data builds are executed least partially concurrently. In response to a negative user input, the first and second data builds may be executed consecutively.

In situations where the builds are to be executed consecutively, a priority may be determined as to which build should be performed first. In some implementations, the build that was initiated first is allowed to continue. In other implementations, a particular user may have priority over another user so that a data build that is already underway may be interrupted.

The process ends at operation 9.8.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
receiving, at a build service of a build server, an external dataset and an adaptor application module, the external dataset being in a specific format, the adaptor application module associated with the specific format of the external dataset, the external dataset and the adaptor application module stored in a first location of a distributed file system separate from a second location of the distributed file system where a second external dataset and a second adaptor application module are stored;
in response to the receiving the external dataset, retrieving from the adaptor application module, information relevant to a build pipeline for building an output dataset based, at least in part, on the external dataset, wherein the information includes changes to the external dataset since a previous build of the output dataset is performed and a data schema used in the previous build, wherein the information allows the external dataset to be incorporated into the build pipeline, wherein the build pipeline involves only in one or more formats other than the specific format;
incorporating the external dataset into the build pipeline using the information relevant to the building pipeline without the external dataset being reformatted in accordance with requirements of the build service, thereby performing data revision control on the external dataset by a set of interconnected processors that are interconnected by one or more communication networks; and implementing the build pipeline as a current build following the previous build to generate the output dataset.

2. The method of claim 1, the information further including a dataset title.

3. The method of claim 1, further comprising the build service receiving a request from the adaptor application module for information relevant to a most recent data build run by the build service; and in response thereto, providing, by the build service to the adaptor application module, the most recent data build run by the build service.

4. A computer system comprising: one or more processors; one or more non-transitory computer-readable storage media coupled to the one or more processors and storing one or more sequences of instructions which, when executed using the one or more processors, cause the one or more processors to perform:

receiving, at a build service of a build server, an externa dataset and an adaptor application module, the external dataset being in a specific format, the adaptor application module associated with the specific format of the external dataset, the external dataset and the adaptor application module stored in a first location of a distributed the system separate from a second location of the distributed the system, where a second external dataset and a second adaptor application module are stored;

in response to the receiving the external dataset, retrieving from the adaptor application module the information relevant to a build pipeline for building an output dataset based, at least in part, on the external dataset, wherein the information includes changes to the external dataset since a previous build of the output dataset is performed and a data schema used in the previous build, wherein the information allows the external dataset to be incorporated into the build pipeline, wherein the build pipeline involves only in one or more formats other than the specific format;

incorporating the external dataset into the build pipeline using the information relevant to the building pipeline without the external dataset being reformatted in accordance with requirements of the build service, thereby performing data revision control on the external dataset by a set of interconnected processors that are interconnected by, one or more communication networks; and implementing the build pipeline as a current build following the previous build to generate the output dataset.

5. The computer system of claim 4, the information further including a dataset title.

6. The computer system of claim 4, the one or more non-transitory computer-readable storage media further comprising instructions which when executed cause performing: the build service receiving a request from the adaptor application module for information relevant to a most recent data build run by the build service; and in response thereto, providing, by the build service to the adaptor application module, the most recent data build run by the build service.

\* \* \* \* \*

UNITED STATES PATENT AND TRADEMARK OFFICE
CERTIFICATE OF CORRECTION

PATENT NO. : 11,354,281 B2
APPLICATION NO. : 15/815367
DATED : June 7, 2022
INVENTOR(S) : Patrick Koenig, Paul Nepywoda and Robert Fink Page 1 of 1

It is certified that error appears in the above-identified patent and that said Letters Patent is hereby corrected as shown below:

In the Claims

Claim 1, Column 22, Line 61, before "only" insert --data--
Claim 4, Column 23, Line 20, delete "externa" insert --external--
Claim 4, Column 23, Line 26, delete "the" insert --file--
Claim 4, Column 23, Line 27, delete "the" insert --file--
Claim 4, Column 23, Line 31, delete "the"
Claim 4, Column 24, Line 8, before "only" insert --data--

Signed and Sealed this
Sixth Day of September, 2022

Katherine Kelly Vidal
*Director of the United States Patent and Trademark Office*